(12) United States Patent
Chen et al.

(10) Patent No.: US 11,549,553 B1
(45) Date of Patent: Jan. 10, 2023

(54) HYDRODYNAMIC BEARING STRUCTURE

(71) Applicant: TUNG PEI INDUSTRIAL CO., LTD., Taipei (TW)

(72) Inventors: Yu-Yueh Chen, Taoyuan County (TW); Ching-Hui Yu, Taoyuan (TW); Hua-Cheng Chuang, Taoyuan (TW)

(73) Assignee: TUNG PEI INDUSTRIAL CO., LTD., Taipei (TW)

( * ) Notice: Subject to any disclaimer, the term of this patent is extended or adjusted under 35 U.S.C. 154(b) by 0 days.

(21) Appl. No.: 17/496,771

(22) Filed: Oct. 8, 2021

(30) Foreign Application Priority Data

Jul. 19, 2021 (TW) .................................. 110126348

(51) Int. Cl.
*F16C 17/12* (2006.01)
*F16C 17/02* (2006.01)
*F16C 33/10* (2006.01)

(52) U.S. Cl.
CPC ............ *F16C 17/12* (2013.01); *F16C 17/026* (2013.01); *F16C 33/107* (2013.01)

(58) Field of Classification Search
CPC .... F16C 17/026; F16C 17/102; F16C 17/107; F16C 17/12; F16C 33/107
See application file for complete search history.

(56) References Cited

U.S. PATENT DOCUMENTS

| | | | | |
|---|---|---|---|---|
| 5,715,116 A * | 2/1998 | Moritan | ............... | H02K 5/1675 310/90 |
| 5,941,646 A * | 8/1999 | Mori | ..................... | F16C 17/026 384/279 |
| 6,364,532 B1 * | 4/2002 | Yoshikawa | ........... | F16C 33/107 384/114 |
| 6,609,829 B2 * | 8/2003 | Saito | ....................... | F16C 17/08 384/100 |
| 2006/0274448 A1 * | 12/2006 | Asada | .................... | F16C 33/103 360/99.08 |
| 2008/0259424 A1 * | 10/2008 | Itami | ..................... | F16C 33/107 359/200.1 |
| 2015/0192171 A1 * | 7/2015 | Yeh | ........................ | H02K 7/086 384/123 |

* cited by examiner

*Primary Examiner* — Alan B Waits
(74) *Attorney, Agent, or Firm* — Li & Cai Intellectual Property Office

(57) ABSTRACT

A hydrodynamic bearing structure is provided. The hydrodynamic bearing structure includes a bearing body, a shaft hole, at least one oil guide groove assembly, at least one air escape unit, and a recess. The shaft hole is formed in the bearing body and penetrates through the bearing body to two ends of the bearing body. The oil guide groove assembly is formed on an inner wall of the shaft hole. The air escape unit is disposed on an outer wall of the bearing body, and has a groove or a tangent plane. The recess is formed at one of the two ends (e.g., a bottom end or a top end) of the bearing body. The recess is spatially communicated with the air escape unit so that an exhaust passage is formed between an axis of the bearing structure and the air escape unit.

15 Claims, 7 Drawing Sheets

HYDRODYNAMIC BEARING STRUCTURE

CROSS-REFERENCE TO RELATED PATENT APPLICATION

This application claims the benefit of priority to Taiwan Patent Application No. 110126348, filed on Jul. 19, 2021. The entire content of the above identified application is incorporated herein by reference.

Some references, which may include patents, patent applications and various publications, may be cited and discussed in the description of this disclosure. The citation and/or discussion of such references is provided merely to clarify the description of the present disclosure and is not an admission that any such reference is "prior art" to the disclosure described herein. All references cited and discussed in this specification are incorporated herein by reference in their entireties and to the same extent as if each reference was individually incorporated by reference.

FIELD OF THE DISCLOSURE

The present disclosure relates to a hydrodynamic bearing structure, and more particularly to a bearing structure in which a pressure field caused due to changes in flow velocity of a fluid flowing between the bearing and a shaft enables the shaft to spin steadily without coming into contact with the bearing.

BACKGROUND OF THE DISCLOSURE

A conventional dynamic bearing has an oil guide groove formed on an inner wall of a bearing body or on an outer wall of a shaft, and pressure is formed when a lubricating fluid flows between the shaft and the bearing body. Due to a supporting force of an oil film, the shaft does not come in contact with sidewalls of a shaft hole when spinning, such that the shaft is prevented from colliding with the bearing body, thereby avoiding wear and reducing generation of noise and vibration. Therefore, the conventional dynamic bearing is nowadays often applied in consumer electronics. However, an air escape space is limited in the conventional dynamic bearing. Although the air escape space can be increased by having a groove or a tangent plane arranged on an outer wall of the bearing body, when the conventional dynamic bearing is installed in a motor, hot air is often still difficult to be discharged, so that a performance of the motor is limited.

SUMMARY OF THE DISCLOSURE

In response to the above-referenced technical inadequacy, the present disclosure provides a hydrodynamic bearing structure, in which an exhaust passage is formed between an axis of the bearing structure and an air escape unit arranged outside of the hydrodynamic bearing structure so that gas can be discharged, thereby enhancing an exhaust function of the bearing.

In one aspect, the present disclosure provides a hydrodynamic bearing structure, which includes a bearing body, a shaft hole, at least one oil guide groove assembly, at least one air escape unit, and a recess. The shaft hole is formed in the bearing body and penetrates through the bearing body to two ends of the bearing body. The at least one oil guide groove assembly is formed on an inner wall of the shaft hole, and includes a plurality of oil guide grooves. The at least one air escape unit is disposed on an outer wall of the bearing body, and has a groove or a tangent plane. The at least one air escape unit extends to the two ends of the bearing body. The recess is formed at one of the two ends of the bearing body, and a hole is formed between the recess and the at least one air escape unit so that the recess is communicated with the at least one air escape unit through the hole.

In certain embodiments, the recess has a depth of 0.2 mm or more.

In certain embodiments, the recess has a depth of 0.1 mm to 1 mm.

In certain embodiments, the bearing body has an internal diameter, and the at least one air escape unit has the groove. The groove extends in a direction toward an axis of the bearing body to the internal diameter, and an inner diameter of the recess is greater than the internal diameter.

In certain embodiments, the bearing body has a diameter of an inscribed circle, and the at least one air escape unit has the tangent plane. The tangent plane is tangent to the diameter of the inscribed circle, and an inner diameter of the recess is greater than the diameter of the inscribed circle.

Therefore, the hydrodynamic bearing structure provided by the present disclosure includes the bearing body, the shaft hole, the at least one oil guide groove assembly, the at least one air escape unit, and the recess. The shaft hole is formed in the bearing body. The at least one oil guide groove assembly is formed on the inner wall of the shaft hole. The at least one air escape unit is disposed on the outer wall of the bearing body, and has the groove or the tangent plane. The recess is formed at one of the two ends of the bearing body, and the recess is spatially communicated with the at least one air escape unit. In this way, the exhaust passage is formed between the axis of the bearing structure and the at least one air escape unit arranged outside of the hydrodynamic bearing structure so that the gas can be discharged. Accordingly, the exhaust function of the hydrodynamic bearing is enhanced, such that a performance of a motor can be effectively improved.

These and other aspects of the present disclosure will become apparent from the following description of the embodiment taken in conjunction with the following drawings and their captions, although variations and modifications therein may be affected without departing from the spirit and scope of the novel concepts of the disclosure.

BRIEF DESCRIPTION OF THE DRAWINGS

The described embodiments may be better understood by reference to the following description and the accompanying drawings, in which.

DETAILED DESCRIPTION OF THE EXEMPLARY EMBODIMENTS

Figure 1:
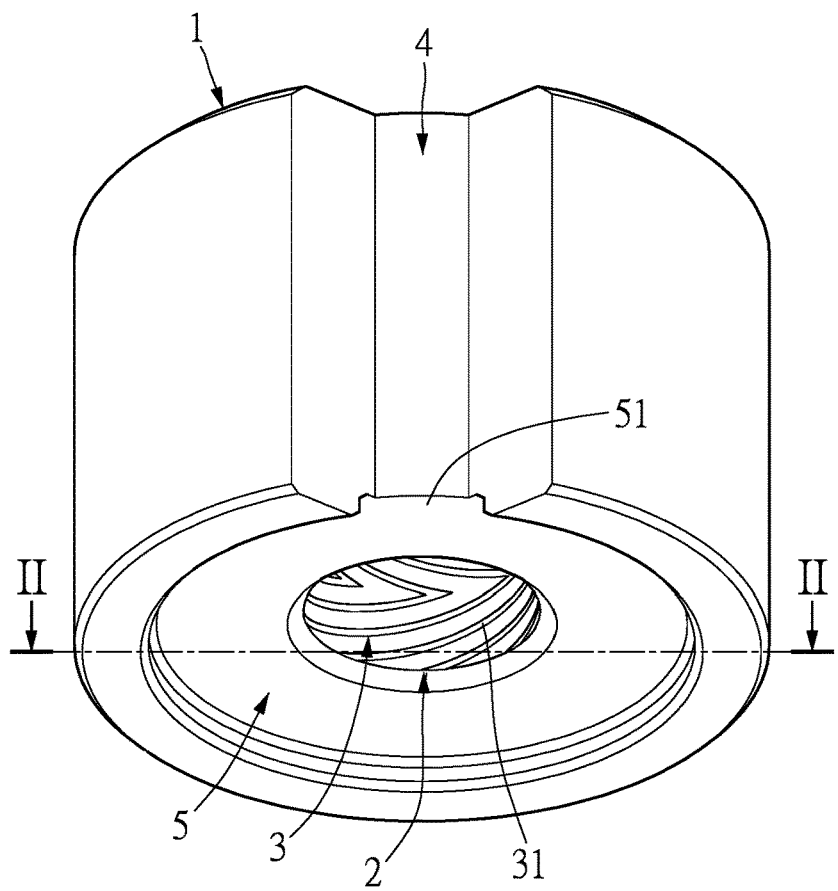
FIG. 1 is a schematic perspective view of a hydrodynamic bearing structure according to a first embodiment of the present disclosure.

The present disclosure is more particularly described in the following examples that are intended as illustrative only since numerous modifications and variations therein will be apparent to those skilled in the art. Like numbers in the drawings indicate like components throughout the views. As used in the description herein and throughout the claims that follow, unless the context clearly dictates otherwise, the meaning of "a", "an", and "the" includes plural reference, and the meaning of "in" includes "in" and "on". Titles or subtitles can be used herein for the convenience of a reader, which shall have no influence on the scope of the present disclosure.

The terms used herein generally have their ordinary meanings in the art. In the case of conflict, the present document, including any definitions given herein, will prevail. The same thing can be expressed in more than one way. Alternative language and synonyms can be used for any term(s) discussed herein, and no special significance is to be placed upon whether a term is elaborated or discussed herein. A recital of one or more synonyms does not exclude the use of other synonyms. The use of examples anywhere in this specification including examples of any terms is illustrative only, and in no way limits the scope and meaning of the present disclosure or of any exemplified term. Likewise, the present disclosure is not limited to various embodiments given herein. Numbering terms such as "first", "second" or "third" can be used to describe various components, signals or the like, which are for distinguishing one component/signal from another one only, and are not intended to, nor should be construed to impose any substantive limitations on the components, signals or the like.

First Embodiment

Figure 2:
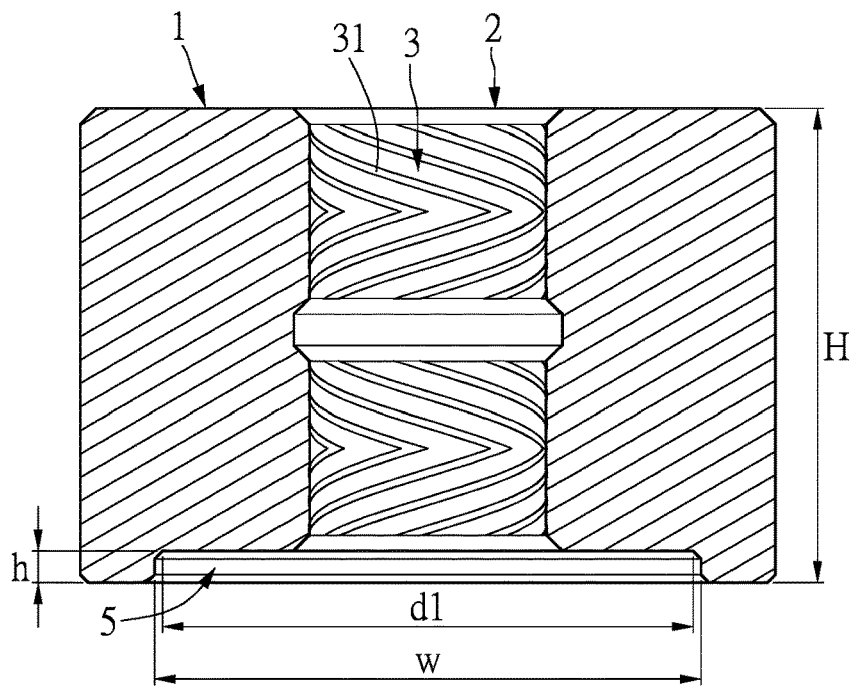
FIG. 2 is a schematic cross-sectional view taken along line II-II of FIG. 1.
Figure 3:
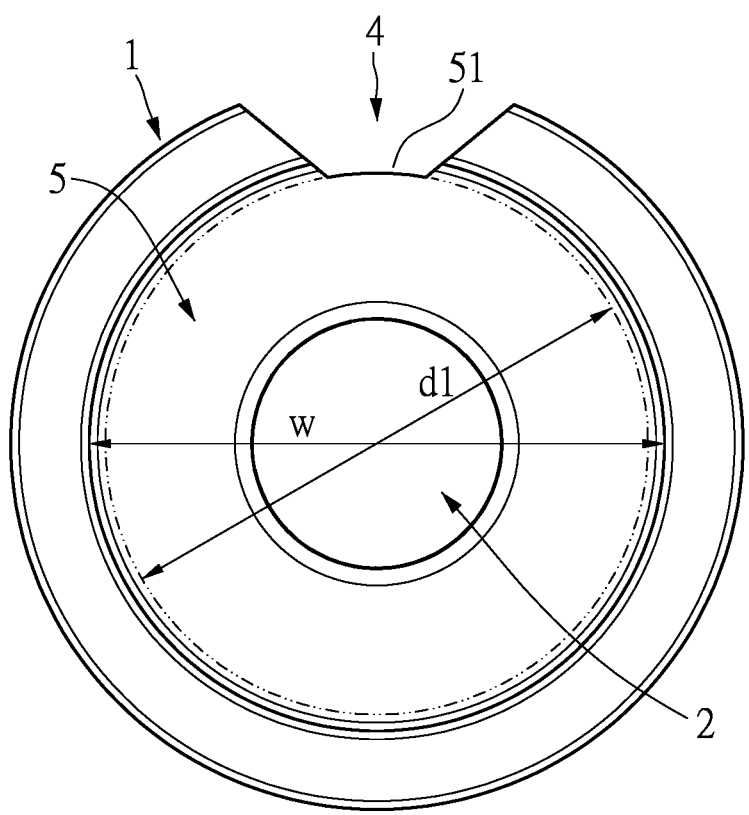
FIG. 3 is a schematic bottom view of the hydrodynamic bearing structure according to the first embodiment of the present disclosure.

Referring to FIG. 1 to FIG. 3, a first embodiment of the present disclosure provides a hydrodynamic bearing structure, which includes a bearing body 1, a shaft hole 2, at least one oil guide groove assembly 3, at least one air escape unit 4, and a recess 5, Preferably, the hydrodynamic bearing structure can be formed by a turning process.

The bearing body 1 is roughly in the shape of a hollow cylinder, and an outer wall (i.e., an outer surface) of the bearing body 1 can have a constant diameter or a variable diameter along a length of the outer wall. In the present embodiment, the outer wall of the bearing body 1 has the constant diameter along its length. In another embodiment (omitted in the drawings), the outer wall of the bearing body 1 can also have the variable diameter along its length. A height H of the bearing body 1 can be from 1 mm to 10 mm. For example, the height H of the bearing body 1 can be 1 mm, 2 mm, 3 mm, 4 mm, 5 mm, 6 mm, 7 mm, 8 mm, 9 mm, or 10 mm. Preferably, the height H of the bearing body 1 is from 4 mm to 5 mm, but is not limited thereto.

The shaft hole 2 is formed in the bearing body 1. The shaft hole 2 is a circular hole, and penetrates through the bearing body 1 to two ends of the bearing body 1, so as to cooperate with a shaft.

The oil guide groove assembly 3 is formed on an inner wall of the shaft hole 2. A quantity of the one oil guide groove assembly 3 can be one, two, three, etc., but is not limited thereto. The oil guide groove assembly 3 includes a plurality of grooves 31. The plurality of grooves 31 each are V-shaped, and can be spaced apart at intervals. The plurality of grooves 31 can be used for guiding a lubricating fluid, so that the lubricating fluid flows between the shaft and the bearing body 1 and pressure is accordingly formed. Through a support of an oil film, the shaft does not contact the inner wall of the shaft hole 2 when spinning, such that the shaft is prevented from colliding with the bearing body, thereby avoiding wear and reducing generation of noise and vibration. The hydrodynamic bearing structure described above relates to conventional technology, and details thereof are not reiterated herein.

The air escape unit 4 is disposed on an outer wall of the bearing body 4. A quantity of the air escape unit 4 can be one, two, three, etc., but is not limited thereto. The air escape unit 4 can have a groove or a tangent plane. A part of the outer wall of the bearing body 1 is recessed to form the air escape unit 4, so that an exhaust (or air escape) space is formed on the outer wall of the bearing body 1. In the present embodiment, the air escape unit 4 has a quantity of one and has the groove. In addition, the air escape unit 4 extends to the two ends of the bearing body 1. A cross-section of the air escape unit 4 (i.e., the groove) can be trapezoidal, V-shaped, square, etc., but is not limited thereto.

The recess 5 is formed at one end (e.g., a bottom end or a top end) of the bearing body 1. In another embodiment, the recess 5 can be correspondingly arranged at the two ends of the bearing body 1. The recess 5 can be a circular recess. The recess 5 is recessed at the one end of the bearing body 5, that is, the recess 5 is recessed inwardly toward an axis of the bearing body 1. The recess 5 and the shaft hole 2 can be arranged on a same axis. The recess 5 can be formed by the turning process. Preferably, a depth h of the recess 5 can be 0.2 mm or more. Preferably, the depth h of the recess 5 can be from 0.1 mm to 1 mm, for example, the depth h of the recess 5 can be 0.1 mm, 0.2 mm, 0.3 mm, 0.4 mm, 0.5 mm, 0.6 mm, 0.7 mm, 0.8 mm, 0.9 mm, or 1 mm, so as to achieve an intended exhaust effect. A hole 51 is formed between the recess 5 and the air escape unit 4, so that the recess 5 can be spatially communicated with the air escape unit 4 through the hole 51. In this way, an exhaust passage is formed between the axis of the bearing structure and the air escape unit 4 arranged outside of the hydrodynamic bearing structure so that gas can be discharged. A size of each of the air escape unit 4 and the hole 51 is not limited, but can be changed according to requirements relating to motor speed. A larger air escape unit 4 and a larger hole 51 are required for a higher motor speed, so that a better exhaust (or heat dissipation) effect can be achieved.

Second Embodiment

Figure 4:
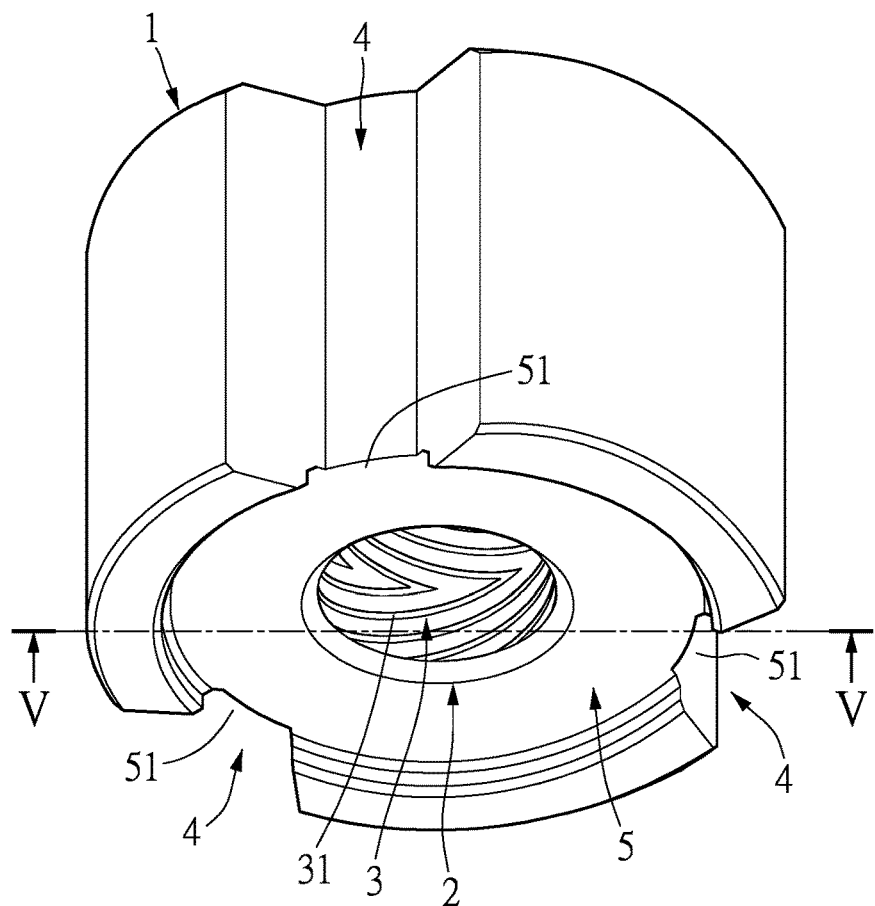
FIG. 4 is a schematic perspective view of a hydrodynamic bearing structure according to a second embodiment of the present disclosure.
Figure 5:
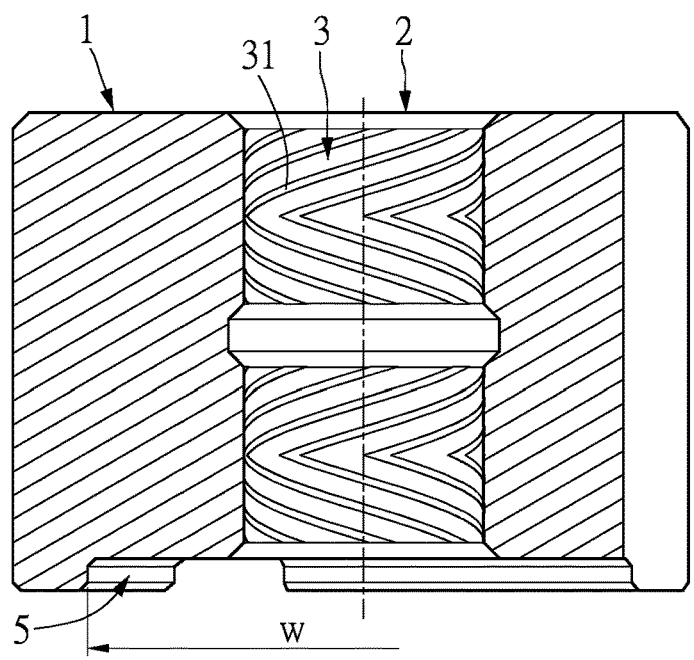
FIG. 5 is a schematic cross-sectional view taken along line V-V of FIG. 4.
Figure 6:
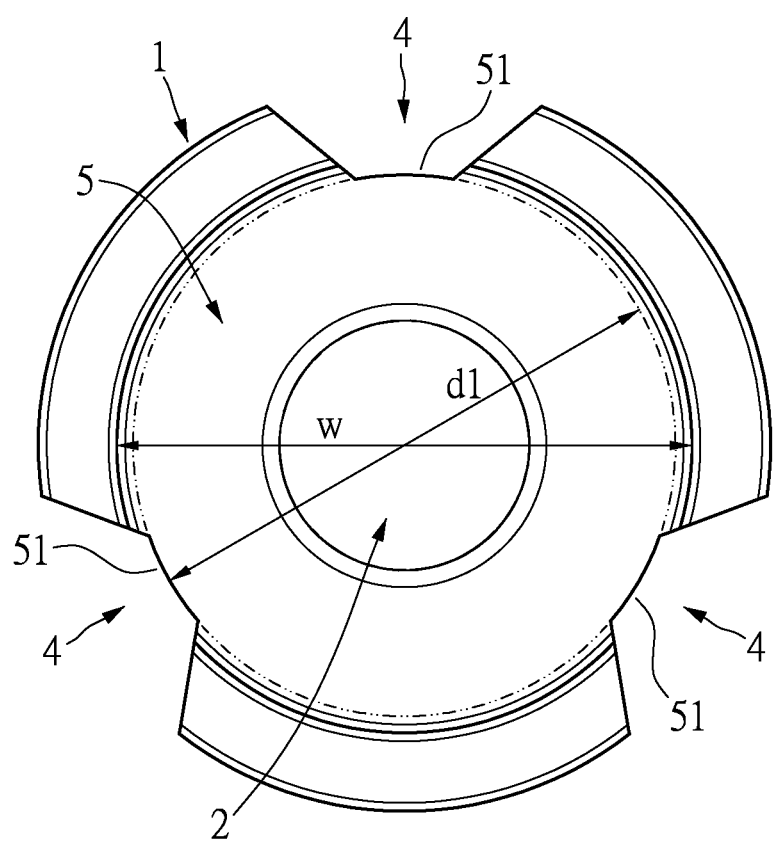
FIG. 6 is a schematic bottom view of the hydrodynamic bearing structure according to the second embodiment of the present disclosure.

Referring to FIG. 4 to FIG. 6, a second embodiment of the present disclosure is substantially the same as the first embodiment described above, but one of the differences resides in that the quantity of the air escape unit 4 is three (or more) in the present embodiment, so as to achieve a better air escape effect. The three air escape units 4 are spaced apart from each other on the outer wall of the bearing body 1. The three air escape units 4 each have the groove, and each extend to the two ends of the bearing body 1. The recess 5 is arranged at the one end of the bearing body 1. The hole 51 is formed between the recess 5 and each of the three air escape units 4. In the present embodiment, there are three holes 51 each correspondingly formed between one of the three air escape units 4 and the recess 5, and the three holes 51 are spaced apart from each other. The three holes 51 each are connected between one of the three air escape units 4 and an edge of the recess 5, so that the recess 5 can be spatially communicated with the three air escape units 4 respectively through the three holes 51. In this way, multiple ones of the exhaust passages are formed between the axis of the bearing structure and the air escape units 4 so that the gas can be discharged therefrom.

As shown in FIG. 2, FIG. 3, FIG. 5, and FIG. 6, the bearing body 1 has an internal diameter d1, the air escape unit 4 has the groove, and the air escape unit 4 (i.e., the groove) extends in a direction toward an axis of the bearing body 1 (i.e., a radial direction) to the internal diameter d1. An inner diameter w of the recess 5 is greater than the internal diameter d1, so that the recess 5 is spatially communicated with the air escape unit 4, thereby achieving the better exhaust effect.

Third Embodiment

Figure 7:
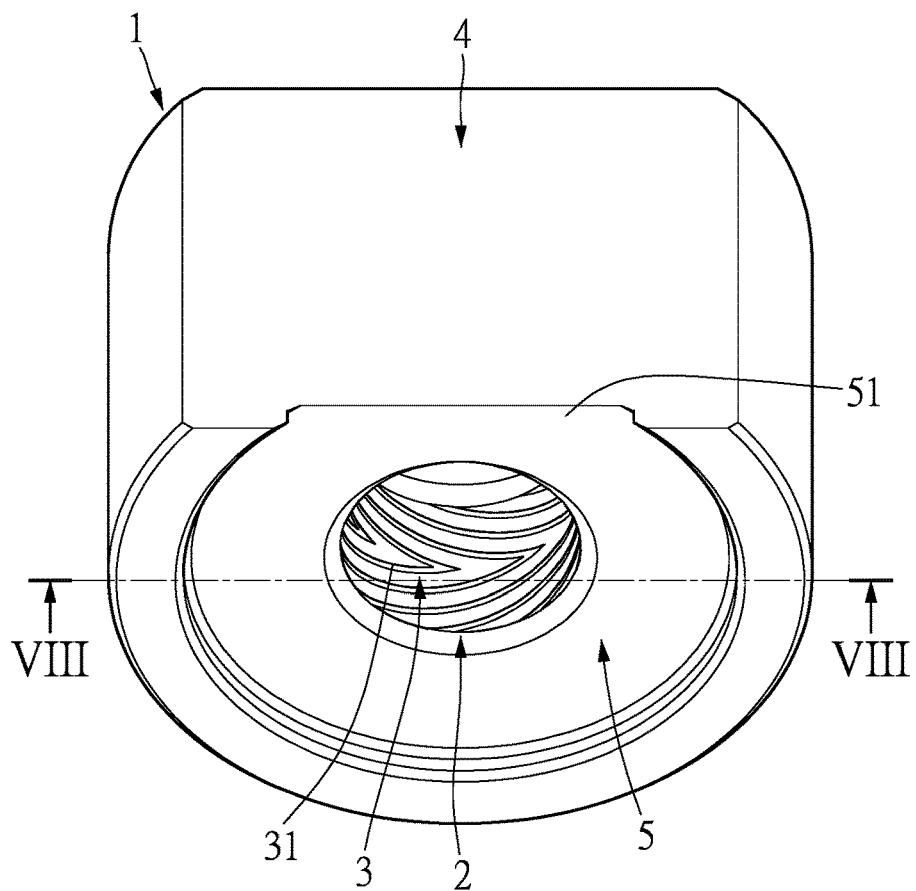
FIG. 7 is a schematic perspective view of a hydrodynamic bearing structure according to a third embodiment of the present disclosure.
Figure 8:
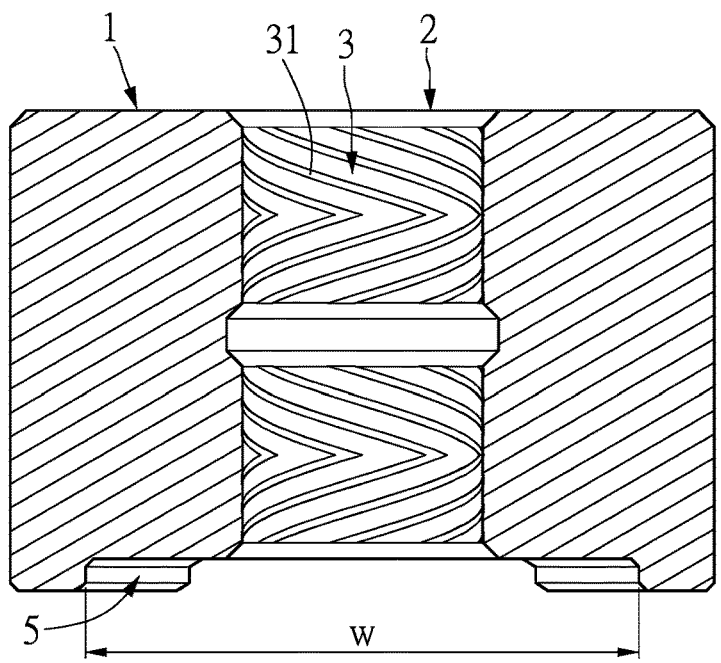
FIG. 8 is a schematic cross-sectional view taken along line VIII-VIII of FIG. 7.
Figure 9:
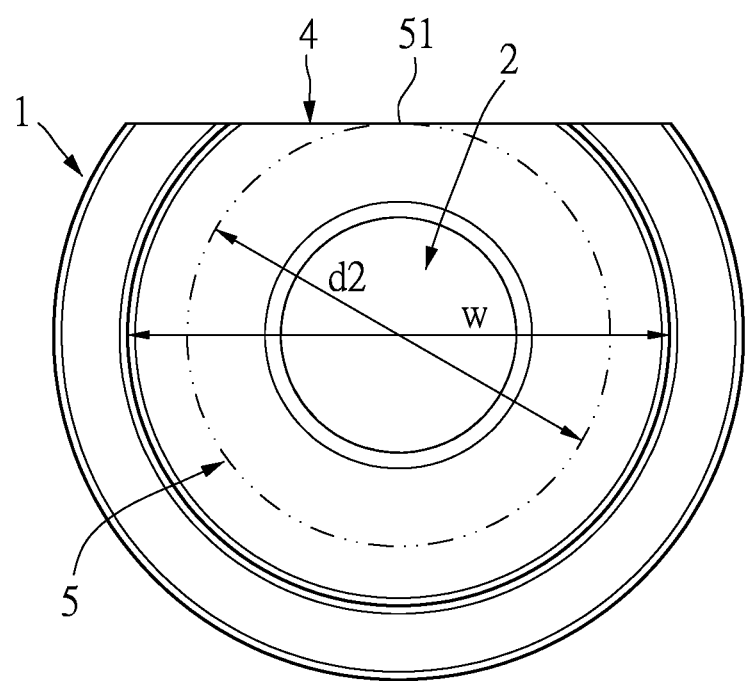
FIG. 9 is a schematic bottom view of the hydrodynamic bearing structure according to the third embodiment of the present disclosure.

Referring to FIG. 7 to FIG. 9, a third embodiment of the present disclosure is substantially the same as the first embodiment described above, but one of the differences resides in that the quantity of the air escape unit 4 is one, the air escape unit 4 has the tangent plane, and the air escape unit 4 extends to the two ends of the bearing body 1. The air escape unit 4 (i.e., the tangent plane) is arranged on the outer wall of one side of the bearing body 1, and the air escape unit 4 (i.e., the tangent plane) can be flat, so that an air escape structure is formed.

The recess 5 is formed at the one end of the bearing body 1. The hole 51 is formed between the recess 5 and the air escape unit 4, so that the recess 5 can be spatially communicated with the air escape unit 4 through the hole 51. In this way, the exhaust passage is formed between the axis of the bearing structure and the air escape units 4 arranged outside of the hydrodynamic bearing structure so that the gas can be discharged therefrom.

Fourth Embodiment

Figure 10:
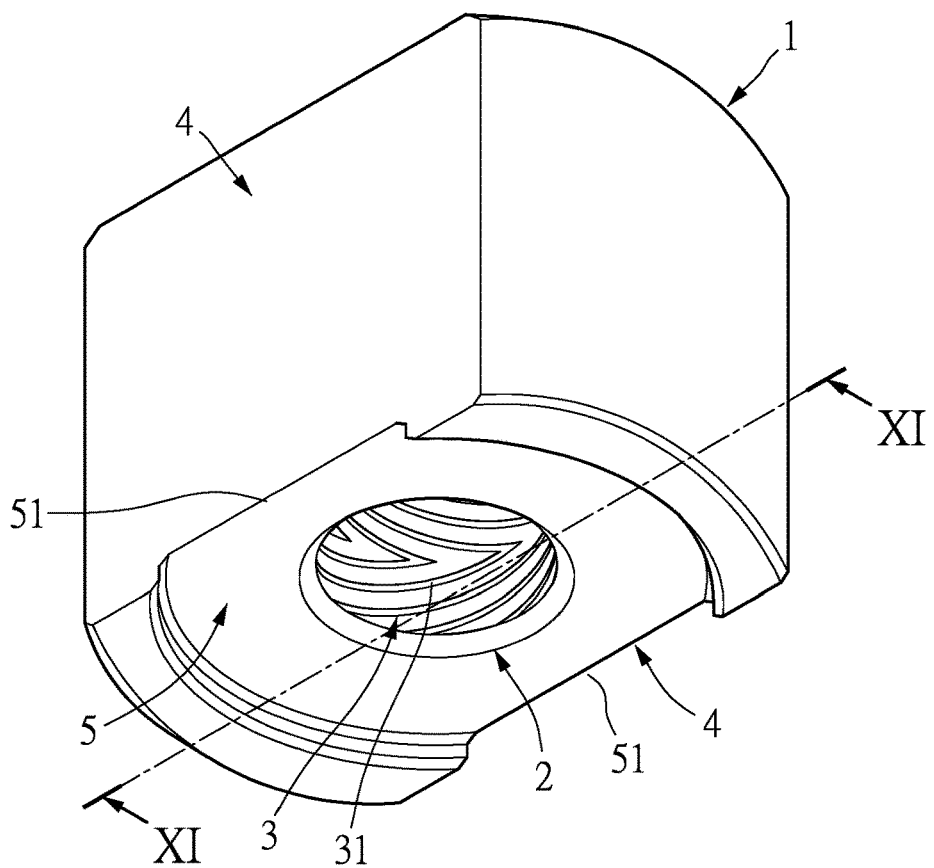
FIG. 10 is a schematic perspective view of a hydrodynamic bearing structure according to a fourth embodiment of the present disclosure.
Figure 11:
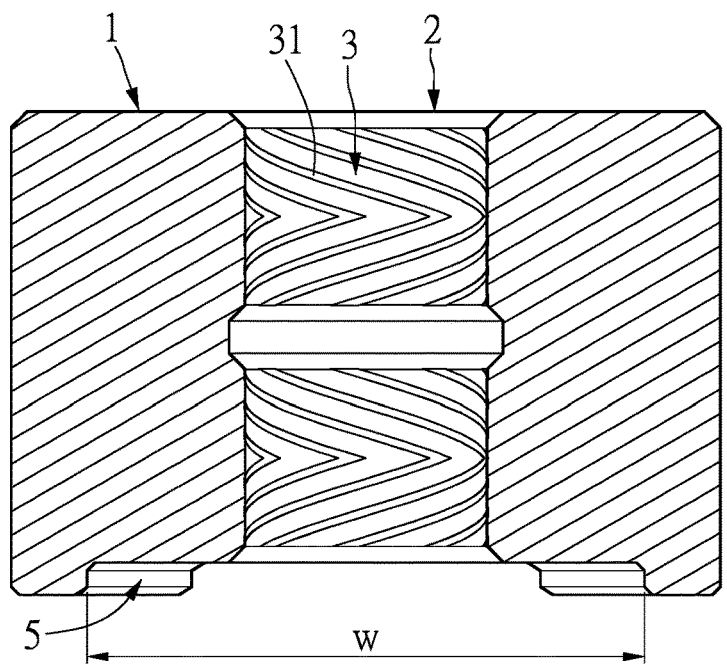
FIG. 11 is a schematic cross-sectional view taken along line XI-XI of FIG. 11.

Referring to FIG. 10 and FIG. 11, a fourth embodiment of the present disclosure is substantially the same as the third embodiment described above, but one of the differences resides in that the quantity of the air escape unit 4 is two. The two air escape units 4 each have the tangent plane, and extend to the two ends of the bearing body 1. The two air escape units 4 (i.e., the two tangent planes) can be parallel or non-parallel to each other, and can be symmetrical or asymmetrical. In the present embodiment, the two air escape units 4 (i.e., the two tangent planes) are parallel to each other and symmetrical.

The recess 5 is formed at the one end of the bearing body 1. The hole 51 is formed between the recess 5 and each of the two air escape units 4, so that the recess 5 can be spatially communicated with each of the two air escape units 4 through the hole 51. In this way, multiple ones of the exhaust passages are formed between the axis of the bearing structure and the air escape units 4 arranged outside of the hydrodynamic bearing structure so that the gas can be discharged therefrom.

As shown in FIG. 8, FIG. 9, and FIG. 11, the bearing body 1 has a diameter of an inscribed circle d2, and the air escape unit 4 has the tangent plane. The air escape unit 4 (i.e., the tangent plane) is tangent to the diameter of the inscribed circle d2, and the inner diameter w of the recess 5 is greater than the diameter of the inscribed circle d2, so that the recess 5 is spatially communicated with the air escape unit 4, thereby achieving the better exhaust effect.

Beneficial Effects of the Embodiments

In conclusion, the hydrodynamic bearing structure provided by the present disclosure includes the bearing body, the shaft hole, the at least one oil guide groove assembly, the at least one air escape unit, and the recess. The shaft hole is formed in the bearing body. The at least one oil guide groove assembly is formed on an inner wall of the shaft hole. The at least one air escape unit is disposed on the outer wall of the bearing body, and has the groove or the tangent plane. The recess is formed at one of the two ends of the bearing body, and the recess is spatially communicated with the at least one air escape unit. In this way, the exhaust passage is formed between the axis of the bearing structure and the at least one air escape unit arranged outside of the hydrodynamic bearing structure so that the gas can be discharged. Accordingly, an exhaust function of the hydrodynamic bearing is enhanced, such that a performance of a motor can be effectively improved.

Further, the depth of the recess is 0.2 mm or more, or the depth of the recess is from 0.1 mm to 1 mm, so as to achieve the intended exhaust effect. In addition, the bearing body has the internal diameter, the at least one air escape unit has the groove, and the groove extends in the direction toward the axis of the bearing body to the internal diameter. The inner diameter of the recess is greater than the internal diameter, so that the better exhaust effect can be achieved. In addition, the bearing body has the diameter of inscribed circle, and the air escape unit 4 has the tangent plane. The tangent plane is tangent to the diameter of inscribed circle, and the inner diameter of the recess is greater than the diameter of inscribed circle, so that a better exhaust effect can be achieved.

The foregoing description of the exemplary embodiments of the disclosure has been presented only for the purposes of illustration and description and is not intended to be exhaustive or to limit the disclosure to the precise forms disclosed. Many modifications and variations are possible in light of the above teaching.

The embodiments were chosen and described in order to explain the principles of the disclosure and their practical application so as to enable others skilled in the art to utilize the disclosure and various embodiments and with various modifications as are suited to the particular use contemplated. Alternative embodiments will become apparent to those skilled in the art to which the present disclosure pertains without departing from its spirit and scope.

What is claimed is:
1. A hydrodynamic bearing structure, comprising:
   a bearing body;
   a shaft hole formed in the bearing body and penetrating through the bearing body to two ends of the bearing body;

at least one oil guide groove assembly formed on an inner wall of the shaft hole, wherein the at least one oil guide groove assembly includes a plurality of oil guide grooves;

at least one air escape unit disposed on an outer wall of the bearing body, wherein the at least one air escape unit has a groove, and extends to the two ends of the bearing body; and a recess formed at one of the two ends of the bearing body, wherein a hole is formed between the recess and the at least one air escape unit so that the recess is communicated with the at least one air escape unit through the hole;

wherein the bearing body has an internal diameter;

wherein the groove extends in a direction toward an axis of the bearing body to the internal diameter, and an inner diameter of the recess is greater than the internal diameter.

2. The hydrodynamic bearing structure according to claim 1, wherein the recess is a circular recess, and the recess is arranged on a same axis as the shaft hole.

3. The hydrodynamic bearing structure according to claim 1, wherein the recess has a depth of 0.2 mm or more.

4. The hydrodynamic bearing structure according to claim 1, wherein the recess has a depth of 0.1 mm to 1 mm.

5. The hydrodynamic bearing structure according to claim 1, wherein the bearing body has a height of 1 mm to 10 mm.

6. The hydrodynamic bearing structure according to claim 1, further comprising a plurality of another air escape units, wherein the air escape units are arranged on the outer wall of the bearing body and are spaced apart from each other.

7. The hydrodynamic bearing structure according to claim 1, further comprising another air escape unit having a tangent plane.

8. A hydrodynamic bearing structure, comprising:
a bearing body;
a shaft hole formed in the bearing body and penetrating through the bearing body to two ends of the bearing body;

at least one oil guide groove assembly formed on an inner wall of the shaft hole, wherein the at least one oil guide groove assembly includes a plurality of oil guide grooves;

at least one air escape unit disposed on an outer wall of the bearing body, wherein the at least one air escape unit has a tangent plane, and extends to the two ends of the bearing body; and a recess formed at one of the two ends of the bearing body, wherein a hole is formed between the recess and the at least one air escape unit so that the recess is communicated with the at least one air escape unit through the hole;

wherein the bearing body has a diameter of an inscribed circle;

wherein the tangent plane is tangent to the diameter of the inscribed circle, and an inner diameter of the recess is greater than the diameter of the inscribed circle.

9. The hydrodynamic bearing structure according to claim 8, wherein the recess is a circular recess, and the recess is arranged on a same axis as the shaft hole.

10. The hydrodynamic bearing structure according to claim 8, wherein the recess has a depth of 0.2 mm or more.

11. The hydrodynamic bearing structure according to claim 8, wherein the recess has a depth of 0.1 mm to 1 mm.

12. The hydrodynamic bearing structure according to claim 8, wherein the bearing body has a height of 1 mm to 10 mm.

13. The hydrodynamic bearing structure according to claim 8, further comprising a plurality of another air escape units, wherein the air escape units are arranged on the outer wall of the bearing body and are spaced apart from each other.

14. The hydrodynamic bearing structure according to claim 8, further comprising another air escape unit having a tangent plane, and the two tangent planes of the two air escape units are parallel or non-parallel to each other.

15. The hydrodynamic bearing structure according to claim 8, further comprising another air escape unit having a tangent plane, and the two tangent planes of the two air escape units are symmetrical or asymmetrical.

* * * * *